(12) United States Patent
Arai

(10) Patent No.: US 11,418,093 B2
(45) Date of Patent: Aug. 16, 2022

(54) ELECTRIC MOTOR WITH IMPROVED HEAT DISSIPATION AND PRODUCTIVITY AND METHOD FOR MANUFACTURING SAME

(71) Applicant: Fanuc Corporation, Yamanashi (JP)

(72) Inventor: Leo Arai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 202 days.

(21) Appl. No.: 16/744,402

(22) Filed: Jan. 16, 2020

(65) Prior Publication Data

US 2020/0244144 A1 Jul. 30, 2020

(30) Foreign Application Priority Data

Jan. 25, 2019 (JP) .............................. JP2019-011619

(51) Int. Cl.
*H02K 9/22* (2006.01)
*H02K 15/14* (2006.01)
*H02K 15/12* (2006.01)
*H02K 5/08* (2006.01)

(52) U.S. Cl.
CPC .................. *H02K 9/22* (2013.01); *H02K 5/08* (2013.01); *H02K 15/12* (2013.01); *H02K 15/14* (2013.01)

(58) Field of Classification Search
CPC ............ H02K 9/22; H02K 5/08; H02K 15/12; H02K 15/14
See application file for complete search history.

(56) References Cited

U.S. PATENT DOCUMENTS

| 9,893,588 | B2 * | 2/2018 | Makino | H02K 5/203 |
|---|---|---|---|---|
| 10,211,706 | B2 * | 2/2019 | Hayashi | H02K 11/33 |
| 2014/0327335 | A1 | 11/2014 | Mabuchi et al. | |
| 2015/0229191 | A1 * | 8/2015 | Yoshida | H02K 5/1732 |
| | | | | 310/43 |

FOREIGN PATENT DOCUMENTS

| DE | 102016203372 A1 | 9/2017 |
|---|---|---|
| JP | 05328686 A | 12/1993 |
| JP | 2002369449 A | 12/2002 |
| JP | 2004274884 A | 9/2004 |
| JP | 2005348594 A | 12/2005 |
| JP | 2007143245 A | 6/2007 |
| JP | 2008167609 A | 7/2008 |
| JP | 2011139555 A | 7/2011 |
| JP | 2011205775 A | 10/2011 |
| JP | 2014007801 A | 1/2014 |
| JP | 2016046832 A | 4/2016 |
| JP | 2016140148 A | 8/2016 |
| JP | 2018026920 A | 2/2018 |
| JP | 2018082517 A | 5/2018 |
| WO | 2013073496 A1 | 5/2013 |
| WO | 2016113846 A1 | 7/2016 |

* cited by examiner

*Primary Examiner* — Jianchun Qin
(74) *Attorney, Agent, or Firm* — RatnerPrestia

(57) ABSTRACT

An electric motor includes a front housing positioned on a load side and including an annular groove in an inner surface of the front housing, a winding wound around a stator core and including a coil end projecting forward from the stator core and disposed in the annular groove, and a heat conductive resin filled in the annular groove and configured to be in contact with both the coil end and the front housing.

8 Claims, 5 Drawing Sheets

ELECTRIC MOTOR WITH IMPROVED HEAT DISSIPATION AND PRODUCTIVITY AND METHOD FOR MANUFACTURING SAME

CROSS-REFERENCE TO RELATED APPLICATIONS

This application is a new U.S. Patent Application that claims benefit of Japanese Patent Application No. 2019-011619, filed Jan. 25, 2019, the disclosure of this application is being incorporated herein by reference in its entirety for all purposes.

BACKGROUND OF THE INVENTION

1. Field of the Invention

The present invention relates to an electric motor and a method for manufacturing the electric motor, and particularly relates to an electric motor with improved heat dissipation and productivity, and a method for manufacturing the electric motor.

2. Description of the Related Art

A rise in temperature of a winding caused by heat build-up is directly linked to a decrease in a continuous rated torque of an electric motor. Releasing the heat of the winding to the outside is therefore an important issue. Known techniques for improving the heat dissipation and the like of the winding include, for example, a resin mold type in which the entire winding is covered with resin, and a technique that relies solely on a winding impregnating agent that fills a gap between the winding and the stator core.

FIG. 8 is a schematic diagram illustrating an example of an electric motor 50 having increased heat dissipation by a molded resin 51. The molded resin 51 is fabricated by loading a stator core 53 provided with a winding 52 wound thereon into a dedicated mold (not illustrated) and molding the molten resin into the mold. The heat of the winding 52 generated when the electric motor 50 is driven is transferred from the molded resin 51 to the stator core 53 and discharged to the outside.

FIG. 9 is a schematic diagram illustrating an example of an electric motor 60 in which the heat dissipation of the winding is solely dependent on a winding impregnating agent 61 such as a varnish. The winding impregnating agent 61 is primarily used to fix the winding 62, but also fills the gap between the winding 62 and the stator core 63, thereby enhancing heat transfer properties from the winding 62 to the stator core 63.

Other art related to the present application includes the known literature described below. JP 2018-82517 A discloses bringing a molded resin into contact with the winding and a cylindrical portion of a cooling member. In particular, the molded resin enters a groove formed in an inner circumferential surface of the cylindrical portion, and a contact area between the winding and the cooling member is increased.

JP 2018-26920 A discloses bringing a resin mold body into contact with the winding and an upper bearing housing.

JP 2016-46832 A discloses bringing a molded resin into contact with a coil end portion and a case.

JP 2014-7801 A discloses a molded stator in which a resin portion is in contact with a coil and an end plate portion.

JP 2011-205775 A discloses bringing a resin into contact with a stator winding and an end cover. Furthermore, a high heat conductive sheet having a heat conductivity of at least 400 W/mK is integrally molded into the resin.

JP 2011-139555 A discloses a motor in which a high heat conductive resin is molded between a coil and a frame, enhancing heat dissipation while maintaining insulating properties.

JP 2007-143245 A discloses a rotating machine in which a resin that forms an end mold is in contact with a coil end and a motor frame. Furthermore, a filler having high thermal conductivity is mixed into the resin.

JP 2008-167609 A discloses an electric motor in which a mold formed from resin is in contact with a field coil and a case. Furthermore, the mold is also in contact with a refrigerant flow path.

JP 2002-369449 A discloses an electric motor in which a sheet of resin material having high thermal conductivity is interposed between a winding end and a bracket.

JP 5-328686 A discloses filling a heat conductive resin between a drive coil and a holder or a housing to improve heat dissipation. The heat conductive resin faces the space between the stator and the rotor, and is thus presumed to be molded.

SUMMARY OF THE INVENTION

The resin mold type requires various steps for molding the resin, such as attachment and detachment of the mold, degassing, etc., and thus the manufacturing man-hours, manufacturing period, etc. are prolonged. Further, because a dedicated mold, an injection molding machine, and the like are required, there is the problem that manufacturing costs increase. On the other hand, techniques relying solely on a winding impregnating agent cause a reduction in rated torque due to insufficient heat dissipation.

Therefore, a technique for improving the heat dissipation and the productivity of an electric motor by a simple method is required.

An aspect of the present disclosure provides an electric motor including a front housing positioned on a load side and including an annular groove in an inner surface of the front housing, a winding wound around a stator core and including a coil end projecting forward from the stator core and disposed in the annular groove, and a heat conductive resin filled in the annular groove and configured to be in contact with both the coil end and the front housing.

Another aspect of the present disclosure provides a method for manufacturing an electric motor including forming an annular groove in an inner surface of a front housing disposed on a load side, filling the annular groove with a heat conductive resin, winding a winding around a stator core to form a coil end projecting forward from the stator core, and by assembling the front housing to the stator core and disposing the coil end in the annular groove, bringing the heat conductive resin into contact with both the coil end and the front housing.

Yet another aspect of the present disclosure provides a method for manufacturing an electric motor including forming an annular groove in an inner surface of a front housing disposed on a load side, winding a winding around a stator core to form a coil end projecting forward from the stator core, assembling the front housing to the stator core and disposing the coil end in the annular groove, and by filling the annular groove with a heat conductive resin from rearward of the stator core, bringing the heat conductive resin into contact with both the coil end and the front housing.

Further yet another aspect of the present disclosure provides a method for manufacturing an electric motor including forming an annular groove in an inner surface of a front housing disposed on a load side, forming a resin filling path configured to communicate from the annular groove to an outer surface of the front housing, winding a winding around a stator core to form a coil end projecting forward from the stator core, assembling the stator core to the front housing and disposing the coil end in the annular groove, and by filling the annular groove with a heat conductive resin via the resin filling path, bringing the heat conductive resin into contact with both the coil end and the front housing.

DETAILED DESCRIPTION

Figure 1:
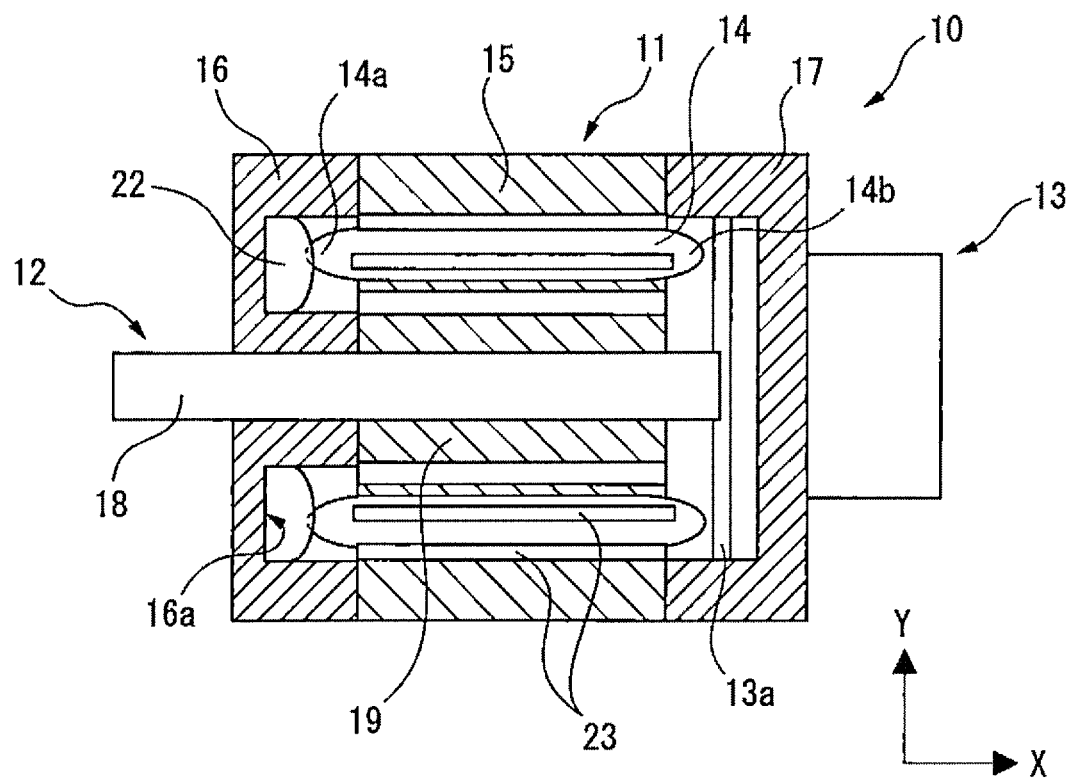
FIG. 1 is a cross-sectional view of an electric motor in an embodiment.

Embodiments of the present disclosure will be described below with reference to the accompanying drawings. In the drawings, identical or similar constituent elements are given identical or similar reference signs. Additionally, the embodiments described below are not intended to limit the technical scope of the disclosure or the meaning of terms set forth in the claims. Note that, in this specification, the terms "front" or "forward" refer to a load side and an output side of an electric motor, and the terms "rear" or "rearward" refer to the side opposite to the load side and the side opposite to the output side of the electric motor.

FIG. 1 is a cross-sectional view of an electric motor 10 in the present embodiment. Note that while the electric motor 10 of the present example is, for example, a servo motor, other electric motors can be used as long as the electric motor includes a winding in the stator. The electric motor 10 includes a stator 11, a rotor 12 disposed on an inner side in a radial direction Y of the stator 11, and a detector 13 that detects a position, a speed, and the like of the rotor 12.

The stator 11 includes a stator core 15 with a winding 14 wound thereon, and a front housing 16 and a rear housing 17 assembled to the stator core 15. On the other hand, the rotor 12 can be constituted by a squirrel-cage rotor, a winding rotor, a permanent-magnet rotor, or the like. The rotor 12 includes an output shaft 18 axially supported by a bearing (not illustrated), a rotor core 19 assembled to the output shaft 18, and a detection circular plate 13a assembled rearward of the output shaft 18. The detector 13 can be constituted by a detector such as an encoder, a resolver, a Hall element, or a tachogenerator, for example. The detector 13 detects the position, the speed, and the like of the rotor 12 on the basis of the detection circular plate 13a.

The front housing 16 is formed of aluminum, iron, stainless steel, other alloys, or the like. The front housing 16 is disposed on the load side and includes an annular groove 16a in an inner surface thereof. The winding 14 includes coil ends 14a and 14b respectively projecting forward and rearward from the stator core 15. The coil end 14a projecting forward is disposed in the annular groove 16a of the front housing 16. The annular groove 16a is filled with a heat conductive resin 22. The heat conductive resin 22 is in contact with both the coil end 14a and the front housing 16. As a result, the heat of the coil end 14a generated when the electric motor 10 is driven is transferred to the front housing 16 and released from the front housing 16 to the outside, thereby improving the heat dissipation of the electric motor 10.

Additionally, the heat conductive resin 22 only needs to be filled (not protruding from the annular groove 16a) by hand or by a machine, and therefore various steps of molding or injection molding are not required, and manufacturing equipment, such as expensive dedicated molds, injection molding machines, and the like, is also unnecessary. Accordingly, the manufacturing period can be shortened and manufacturing costs can be reduced. In turn, the productivity of the electric motor 10 is improved. Note that an annular groove may be provided in the rear housing 17, and this annular groove may be filled with the heat conductive resin 22. As a result, the heat of the coil end 14b, projecting rearward, is transferred to the rear housing 17 and released from the rear housing 17 to the outside, thereby further improving the heat dissipation in such a type of electric motor.

Furthermore, the electric motor 10 may include an impregnating resin 23 such as a varnish applied to the winding 14. The impregnating resin 23 not only fills gaps between windings to fix the winding 14, but also fills a gap between the winding 14 and the stator core 15, and thus the heat generated by the winding 14 is more readily transferred to the stator core 15 and further to the front housing 16, and released to the outside. According to the impregnating resin 23, existing manufacturing equipment, existing manufacturing materials, and the like can be used, making it possible to further reduce manufacturing costs. Furthermore, the impregnating resin 23 is preferably in contact with the heat conductive resin 22. As a result, the heat of the winding 14 is released from the impregnating resin 23 to the heat conductive resin 22, from the heat conductive resin 22 to the front housing 16, and from the front housing 16 to the outside, thereby improving the heat dissipation. In addition, the impregnating resin 23 preferably includes the same components as the heat conductive resin 22. As a result, a contact heat resistance at a contact interface between the heat conductive resin 22 and the impregnating resin 23 is reduced, and heat transfer properties are enhanced.

Figure 2:
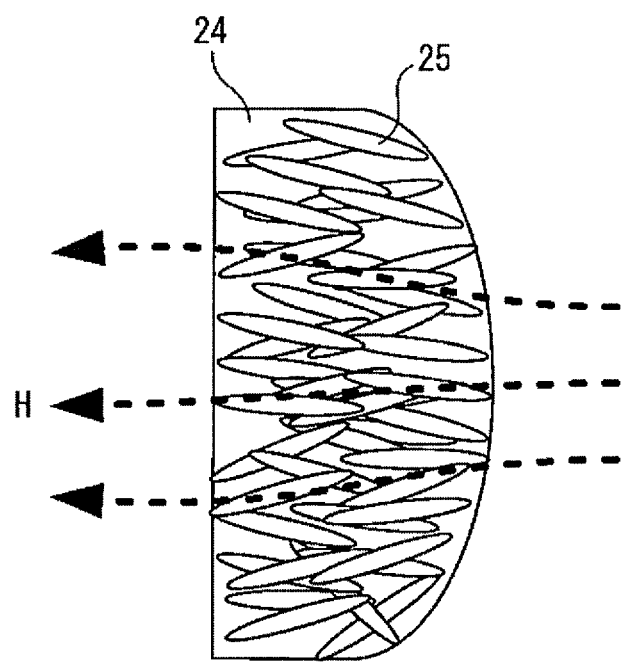
FIG. 2 is an enlarged cross-sectional view of a heat conductive resin in the embodiment.

FIG. 2 is an enlarged cross-sectional view of the heat conductive resin 22 in the present embodiment. The heat conductive resin 22 of the present example includes an insulating heat conductive fiber 25 in a matrix resin 24, the insulating heat conductive fibers 25 are interconnected. Examples of the matrix resin 24 include heat-resistant resins, thermosetting resins such as polyimide resins, silicon resins, epoxy resins, phenol resins, and the like, and thermoplastic resins such as polyphenylene sulfide resins, polycarbonate resins, polybutylene terephthalate resins, polyacetal resins. As the insulating heat conductive fiber 25, aluminum nitride, magnesium oxide, boron nitride, alumina, anhydrous magnesium carbonate, silicon oxide, zinc oxide, and the like can be used.

The insulating heat conductive fiber 25 can be fabricated in a state in which the fibers are interconnected and oriented in an axial direction X inside the matrix resin 24 by being molded into rod shapes, flake shapes, scale shapes, or the like, and added in a large amount to the matrix resin 24. As a result, the heat generated in the coil end 14a is transferred through the interconnected insulating heat conductive fiber network in a heat transfer direction H, and readily transferred to the front housing 16. The heat conductive resin 22 is only filled in the annular groove 16a by hand or by a machine, and thus the resin does not need to be injection molded by high pressure injection, and high fluidity is not required. Therefore, a particle size, a weight ratio, and the like of the insulating heat conductive fiber 25 are increased, and a state in which the fibers are interconnected is readily formed. Note that, instead of the insulating heat conductive fiber 25, an insulating heat conductive filler molded into a granular shape, a spherical shape, or the like may be added to the matrix resin 24.

Figure 3:
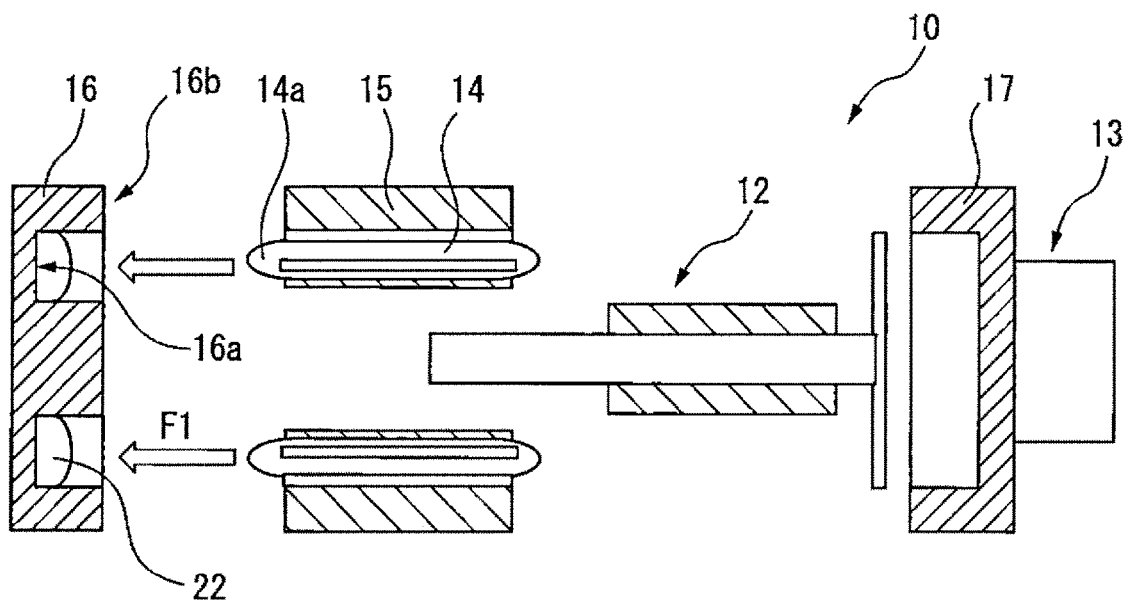
FIG. 3 is an exploded view illustrating a method for manufacturing the electric motor in the embodiment.

FIG. 3 is an exploded view illustrating a method for manufacturing the electric motor 10 in the present embodiment. In a first step, the annular groove 16a is formed in an inner surface 16b of the front housing 16 disposed on the load side. The front housing 16 is molded by die casting, machining, or the like. In a second step, the gel-like or molten heat conductive resin 22 is filled into the annular groove 16a in a filling direction F1. In a third step, the winding 14 is wound around the stator core 15 to form the coil end 14a projecting forward from the stator core 15. In a fourth step, the front housing 16 is assembled to the stator core 15 and the coil end 14a is disposed in the annular groove 16a, thereby bringing the heat conductive resin 22 into contact with both the coil end 14a and the front housing 16. Subsequently, when the heat conductive resin 22 is a thermosetting resin, the front housing 16 is heated to allow the heat conductive resin 22 to solidify. Alternatively, when the heat conductive resin 22 is a thermoplastic resin, the front housing 16 is cooled to allow the heat conductive resin 22 to solidify. As described above, various steps of injection molding, expensive dedicated molds, injection molding machines, and the like are unnecessary. Note that the assembly of the rotor 12, the rear housing 17, and the detector 13 may be performed before solidification or after solidification of the heat conductive resin 22.

Figure 4:
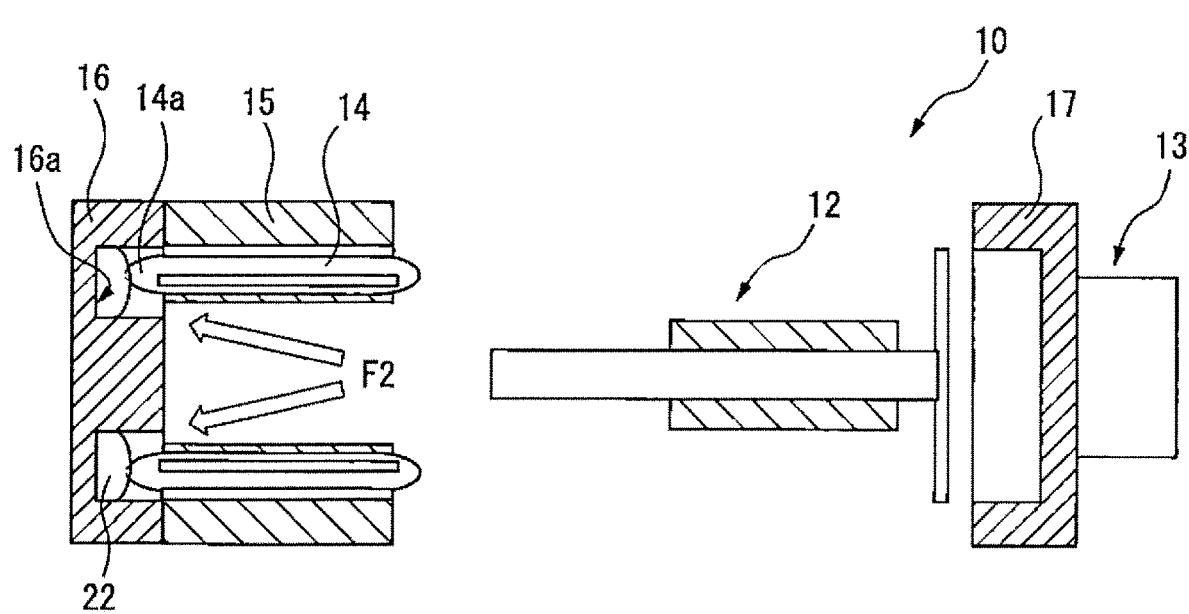
FIG. 4 is an exploded view illustrating a method for manufacturing an electric motor in another embodiment.

FIG. 4 is an exploded view illustrating a method for manufacturing the electric motor 10 in another embodiment. This example differs from the aforementioned manufacturing method in that, after the front housing 16 is assembled to the stator core 15, the annular groove 16a is filled with the heat conductive resin 22 from rearward of the stator core 15. Specifically, in a first step, the annular groove 16a is formed in the inner surface of the front housing 16 disposed on the load side. In a second step, the winding 14 is wound around the stator core 15 to form the coil end 14a. In a third step, the front housing 16 is assembled to the stator core 15 and the coil end 14a is disposed in the annular groove 16a. In a fourth step, the annular groove 16a is filled with the gel-like or molten heat conductive resin 22 in a filling direction F2 from rearward of the stator core 15, thereby bringing the heat conductive resin 22 into contact with both the coil end 14a and the front housing 16. According to such a manufacturing method, the annular groove 16a is filled with the heat conductive resin 22 in a state in which the coil end 14a and the front housing 16 positioned in the annular groove 16a, and thus the heat conductive resin 22 readily comes into contact with both the coil end 14a and the front housing 16. Note that the further subsequent steps are the same as the manufacturing method described above, and thus descriptions thereof will be omitted.

Figure 5:
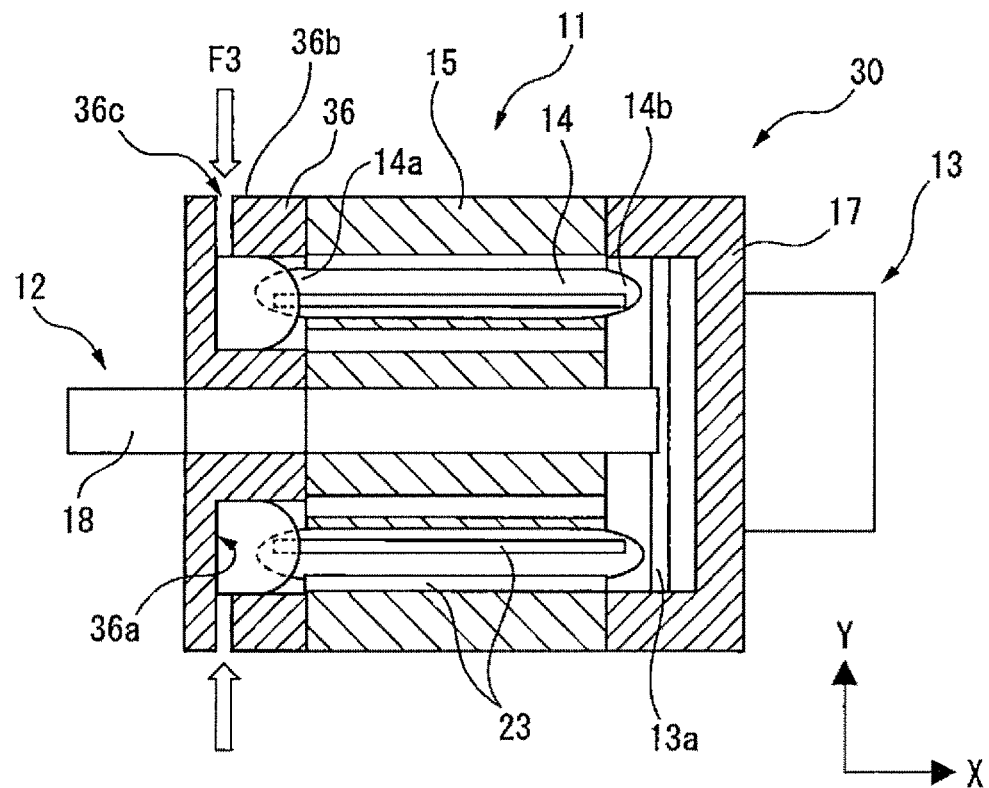
FIG. 5 is a cross-sectional view of an electric motor in yet another embodiment.
Figure 6:
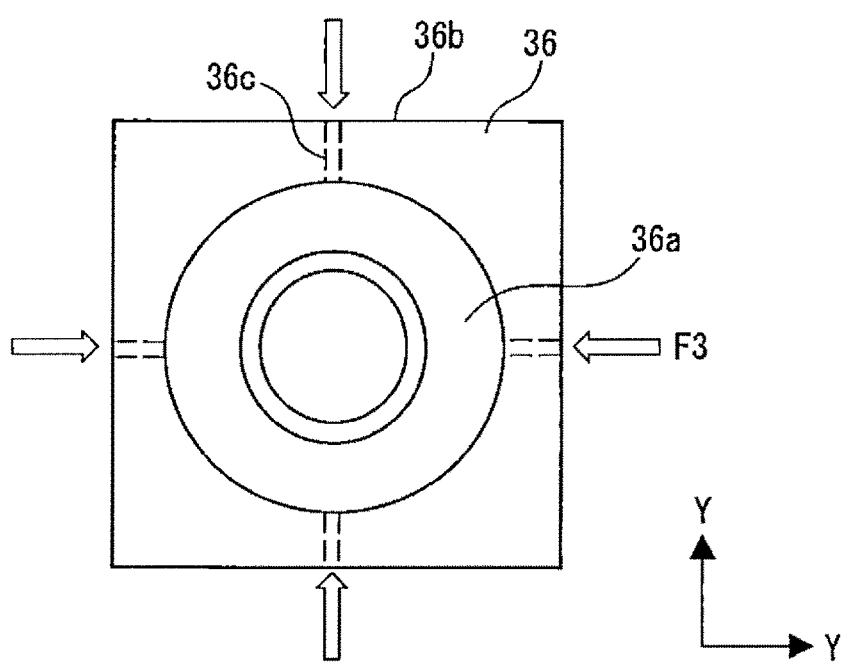
FIG. 6 is an inner surface view of a front housing in the yet another embodiment.

FIG. 5 is a cross-sectional view of an electric motor 30 in yet another embodiment, and FIG. 6 is an inner surface view of a front housing 36. The electric motor 30 of the present example is different from the electric motor 10 described above in that the electric motor 30 includes a resin filling path 36c that communicates from an annular groove 36a to an outer surface 36b of the front housing 36. The resin filling path 36c is formed by die casting, machining, or the like, and extends in the radial direction Y of the front housing 36. The resin filling path 36c is a filling path for the heat conductive resin 22, and thus a plurality, such as three or four, are preferably provided such that the heat conductive resin 22 spreads across the entire annular groove 36a. Further, because the heat conductive resin 22 can be accessed even after being filled, the resin filling path 36c may be used as a cooling path that cools the heat conductive resin 22 and the front housing 36. A cooling device (not illustrated) is connected to the cooling path. As the cooling device, an air cooling type such as a cooling fan, a cooler, a radiator, a water cooling type, an oil cooling type, or the like can be used.

The method for manufacturing the electric motor 30 differs from the manufacturing method described above in that the annular groove 36a is filled with the heat conductive resin 22 via the resin filling path 36c. Specifically, in a first step, the annular groove 36a is formed in the inner surface of the front housing 36 disposed on the load side. In a second step, the resin filling path 36c that communicates from the annular groove 36a to the outer surface 36b of the front housing 36 is formed. In a third step, the winding 14 is wound around the stator core 15 to form the coil end 14a projecting forward from the stator core 15. In a fourth step, the stator core 15 is assembled to the front housing 36 and the coil end 14a is disposed in the annular groove 36a. In a fifth step, the rotor 12, the rear housing 17, and the detector 13 are assembled. In a sixth step, the annular groove 36a is filled with the heat conductive resin 22 in a filling direction F3 via the resin filling path 36c, thereby bringing the heat conductive resin 22 into contact with both the coil end 14a and the front housing 36. Subsequently, the heat conductive resin 22 is allowed to solidify in the same manner as described above. Note that the fifth step may be performed after the heat conductive resin 22 is filled.

Figure 7:
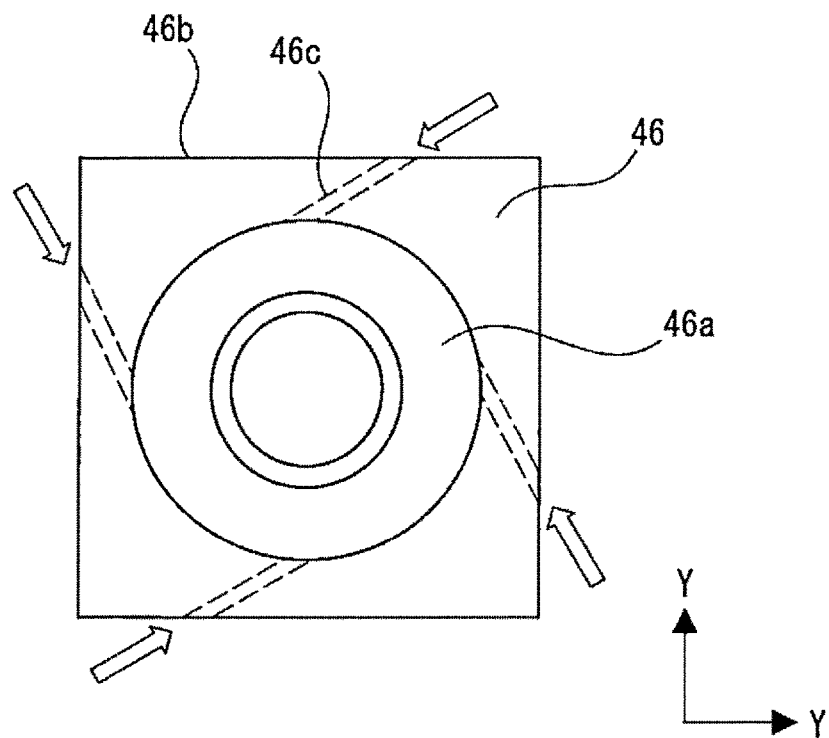
FIG. 7 is an inner surface view of a front housing in further yet another embodiment.
Figure 8:
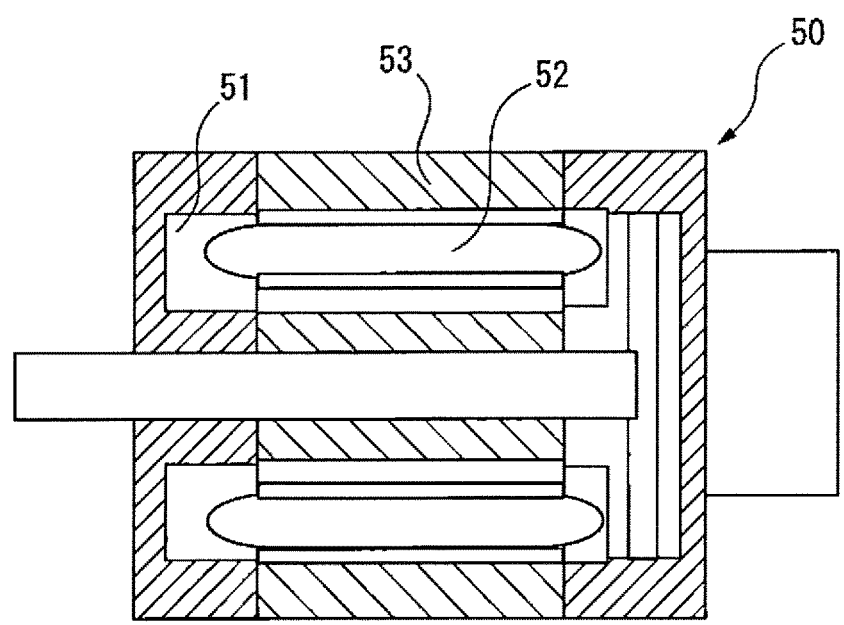
FIG. 8 is a cross-sectional view of an electric motor in the related art.
Figure 9:
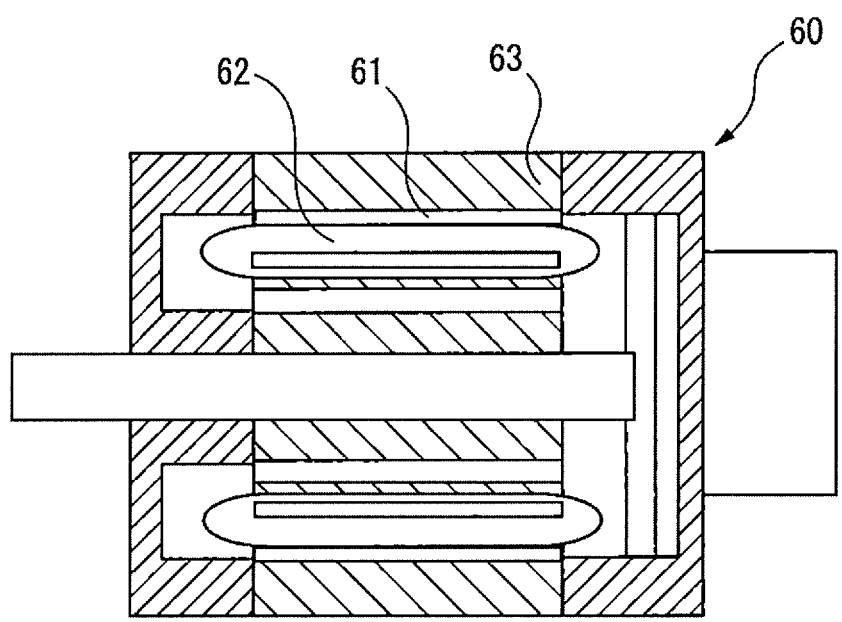
FIG. 9 is a cross-sectional view of an electric motor in another related art.

FIG. 7 is an inner surface view of a front housing 46 in further yet another embodiment. A resin filling path 46c of the present example extends in a direction inclined relative to the radial direction Y of the front housing 46. As a result, the heat conductive resin 22 is readily spread across an annular groove 46a in its entirety. Further, as described above, the resin filling path 46c may be used as a cooling path that cools the heat conductive resin 22 and the front housings 36 or 46. With the resin filling path 46c being inclined relative to the radial direction Y of the front housing 46, the coolant, when air, readily flows through the annular groove 46a in a circumferential direction.

In the various embodiments described above, the front housings 16, 36 and 46 are preferably in contact with a heat dissipating member (not illustrated) to which the electric motor is attached. Examples of the heat dissipating member include metal structural members, heat sinks, and the like. As a result, the heat dissipation of the electric motor 10 is further improved.

According to the above-described embodiments, it is possible to improve the heat dissipation as well as the productivity of the electric motor using a simple technique of filling only the annular grooves 16a, 36a and 46a of the front housings 16, 36 and 46 with the heat conductive resin 22.

Although some embodiments have been described in this specification, the present invention is not limited to the above-described embodiments, and it is to be understood that various changes can be made without departing from the scope of the appended claims.

The invention claimed is:

1. An electric motor comprising:
    a housing including an annular groove in an inner surface of the housing;
    a winding wound around a stator core and including a coil end projecting axially from the stator core and disposed in the annular groove; and
    a heat conductive resin filled in the annular groove and configured to be in contact with both the coil end and the housing,
    wherein the housing comprises a resin filling path configured to penetrate from the annular groove to an outer surface of the housing and fill the heat conductive resin in the annular groove from outside of the motor.

2. The electric motor according to claim 1, further comprising:
    an impregnating resin configured to fill a gap between the winding and the stator core.

3. The electric motor according to claim 2, wherein the impregnating resin comes into contact with the heat conductive resin.

4. The electric motor according to claim 2, wherein the impregnating resin includes the same components as the heat conductive resin.

5. The electric motor according to claim 1, wherein the heat conductive resin includes an insulating heat conductive fiber, the insulating heat conductive fibers are interconnected.

6. The electric motor according to claim 1, wherein the housing comes into contact with a heat dissipating member configured to be attached with the electric motor.

7. The electric motor according to claim 1, wherein the resin filling path is used as a cooling path configured to cool the heat conductive resin and the housing.

8. A method for manufacturing an electric motor comprising:
    forming an annular groove in an inner surface of a housing;
    forming a resin filling path configured to penetrate from the annular groove to an outer surface of the housing;
    winding a winding around a stator core to form a coil end projecting axially from the stator core;
    assembling the stator core to the housing and disposing the coil end in the annular groove; and
    by filling the annular groove with a heat conductive resin via the resin filling path from outside of the motor, bringing the heat conductive resin into contact with both the coil end and the housing.

* * * * *